INVENTOR.
Darriel L. Alsobrooks
BY
Harness, Dickey & Pierce
ATTORNEYS.

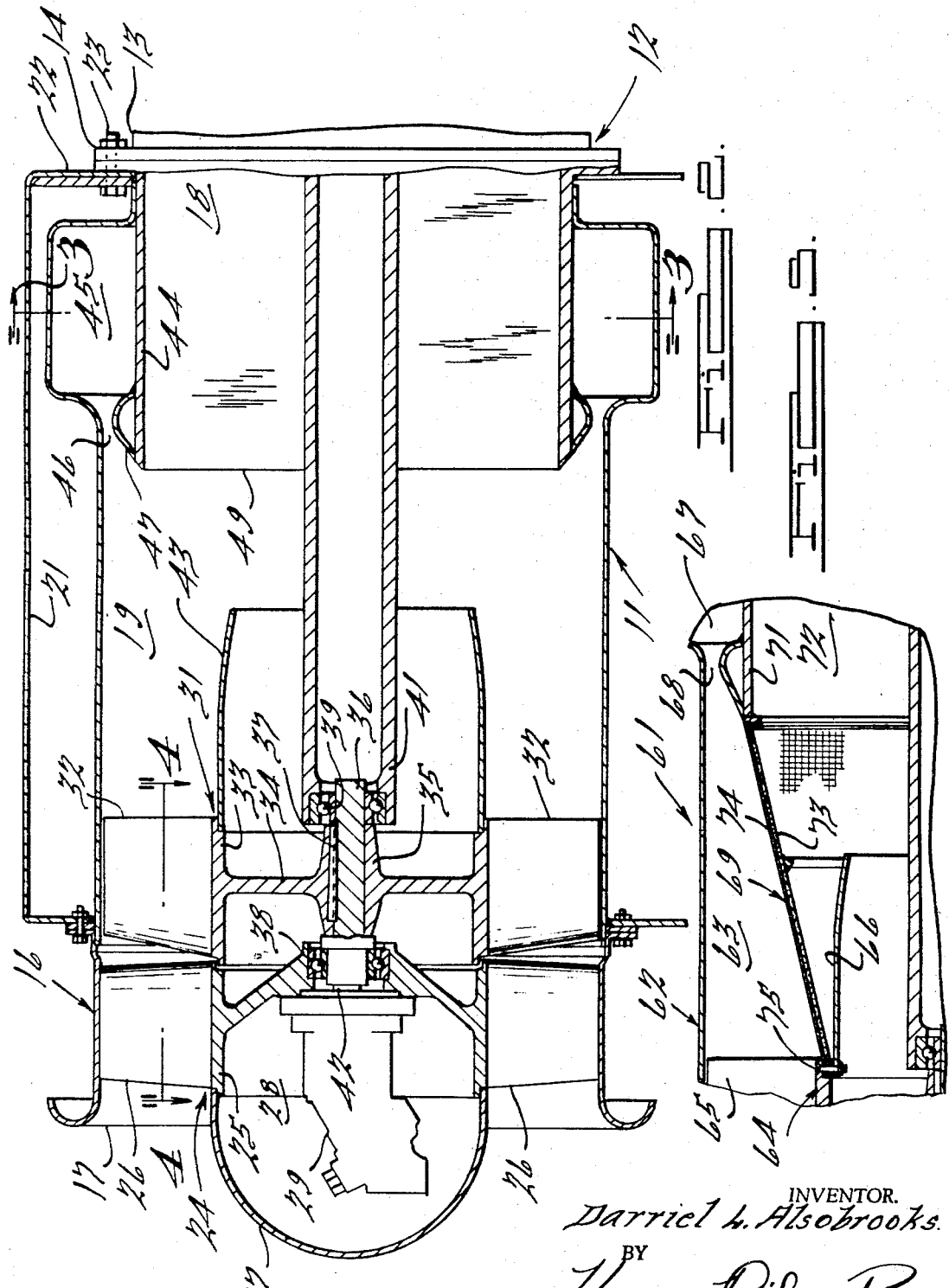

United States Patent Office 3,444,672
Patented May 20, 1969

3,444,672
AIR CLEANER FOR TURBINE ENGINES
Darriel L. Alsobrooks, Grosse Ile, Mich., assignor to Michigan Dynamics, Inc., a corporation of Michigan
Filed May 8, 1967, Ser. No. 636,985
Int. Cl. B01d 45/16, 45/14
U.S. Cl. 55—306                                3 Claims

ABSTRACT OF THE DISCLOSURE

This application discloses a dynamic air cleaner for removing foreign particles from the intake air of a gas turbine engine. The air cleaner embodies a centrifugal impeller for imparting a swirling motion to the intake air to drive the contaminants from the air. The contaminants are discharged through a scroll casing that surrounds the air cleaner. Static vanes are disposed upstream of the impeller to impart an initial swirl to the intake air for reducing the horsepower requirements necessary to drive the impeller. In addition, straightening vanes are positioned in the downstream end of the cleaner so that the discharged air will flow in an axial direction into the associated air inlet of the gas turbine engine.

BACKGROUND OF THE INVENTION

This invention relates to an air cleaner for turbine engines and more particularly to an improved dynamic air cleaner for such engines.

Gas turbine engines have found application in a wide variety of uses. In many of these applications the turbine engine must operate in a dirt and debris laden environment. For example, one use of such engines is for driving the rotors of a helicopter. This type of aircraft tends to create such an environment on landing and take off due to the air turbulence caused by the rotor. The ingestion of dirt, sand and other air borne contaminants into gas turbine engines results in considerable damage to the engine. Such foreign particles can rapidly erode the impeller blades as well as cause other internal damage.

It is, therefore, a principal object of this invention to provide an air cleaner for gas turbine engines.

The use of barrier type filters has been proposed for gas turbine engines to remove contaminants from the intake air. The tremendous volume of air consumed by this type of engine makes the use of a barrier type filter impractical. Barrier type filters will soon become clogged with contaminants and restrict the air flow to such a degree as to make frequent servicing and replacement essential. In addition, it is difficult to provide a barrier type filter that will have sufficient dirt removing efficiency without substantially restricting the intake air flow.

It is, therefore, a further object of this invention to provide a dynamic air cleaner for a gas turbine engine.

It is another object of this invention to provide a dynamic air cleaner for a gas turbine engine that will not adversely effect the performance of the associated engine.

It is a yet further object of this invention to provide a dynamic air cleaner for a gas turbine engine that has a relatively low driving power requirement.

BRIEF SUMMARY OF THE INVENTION

An air cleaner embodying this invention is particularly adapted for removing contaminants from the intake air of a gas turbine engine. The air cleaner includes housing means that define an air inlet end that is adapted to receive atmospheric air, an air outlet end that is adapted to communicate with the air inlet of the associated gas turbine engine and an air passage that extends from the air inlet end to the air outlet end. Impeller means are supported for rotation within the air passage and drive means are provided for rotating the impeller means. Rotation of the impeller means centrifugally extracts contaminants from the air passing through the air passage. Contaminant discharge means are formed around the periphery of the air passage for receiving the extracted contaminants and for precluding their passage from the air outlet end of the gas turbine air inlet.

In one embodiment of the invention, a structure is provided for accurately controlling the minimum size of the contaminants extracted by the air cleaner. This structure is comprised of a perforate member that extends across the air passage downstream of the impeller means. To preclude clogging of this perforate member, it is rotated along with the impeller means to drive the particles from the outer surface of the perforate member.

BRIEF DESCRIPTION OF THE DRAWINGS

FIGURE 2 is an enlarged, longitudinal cross-sectional view of the air cleaner shown in FIGURE 1.

FIGURE 5 is a cross-sectional view, in part similar to FIGURE 2, showing another embodiment of the invention.

DETAILED DESCRIPTION OF THE PREFERRED EMBODIMENTS

Figure 1:
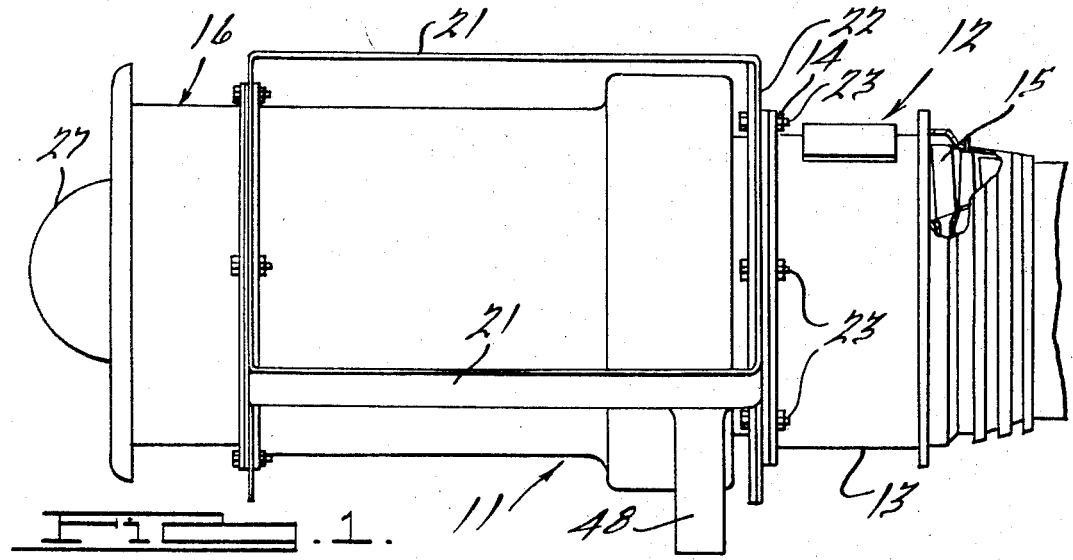
FIGURE 1 is a side elevational view, with a portion broken away, of an air cleaner embodying this invention and a portion of an associated gas turbine engine.

Referring first to FIGURES 1 and 2, an air cleaner for a gas turbine engine embodying this invention is identified generally by the reference numeral 11 and is shown in conjunction with a portion of a gas turbine engine, indicated generally by the reference numeral 12, which may be of any known type. The engine 12 includes an air intake portion 13 that terminates in a radially outwardly extending flange portion 14. An axial flow compressor 15 is positioned in the inlet stage of the engine 12 downstream of the air inlet portion 13. The remainder of the engine 12 will not be described in detail since it forms no part of this invention.

Figure 4:
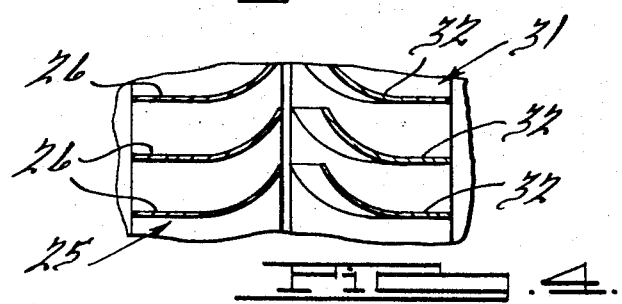
FIGURE 4 is a cross-sectional view taken along the line 4—4 of FIGURE 2.
Figure 3:
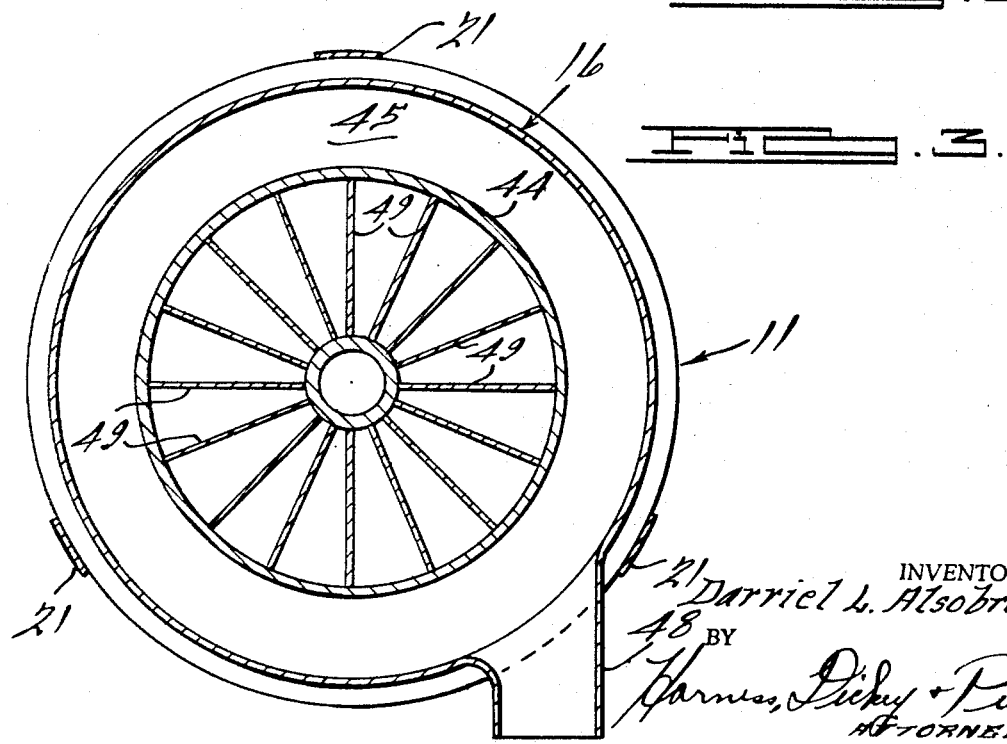
FIGURE 3 is a cross-sectional view taken along the line 3—3 of FIGURE 2.

Referring now in addition to FIGURES 3 and 4, the air cleaner 11 is comprised of a housing assembly, indicated generally by the reference numeral 16. The housing 16 may be fabricated from a number of separate pieces or may be a single piece, with the former type of construction being shown. The housing 16 defines an air inlet end 17 that is adapted to receive atmospheric air, an air outlet end 18 that registers with the air intake portion 13 of the gas turbine engine 12 and an air passage 19 that extends between the inlet end 17 and the outlet end 18. In addition, a supporting bracket 21 encircles the housing 16 and provides an inwardly extending flange 22 that is affixed to the turbine flange 14 by means of a plurality of circumferentially spaced bolt and nut assemblies 23 to support the air cleaner 11 upon the engine 12.

Supported within the air passage 19 adjacent the air inlet end 17 is a static vane assembly, indicated generally by the reference numeral 24. The static vane assembly is comprised of an annular hub section 25 from which a plurality of static vanes 26 radiate. As seen in FIGURE 4, the vanes 26 are formed to impart a swirling motion to the intake air as it is drawn into the air cleaner 11. The use of the static vanes 26 reduces the power necessary to drive the impeller assembly, which will be described, and assist in obtaining the necessary swirling and centifugal force upon the intake air. A nacelle 27 that coacts with the housing 16 to define an annular air inlet for the air cleaner 11 at the inlet end 17 is fixed to the hub portion 25. In addition, the nacelle 27 and hub portion 25 define an enclosed chamber 28 in which a driving motor 29 is supported. The motor 29 may be a hydraulic motor operated by an accessory pump driven by the gas turbine 12, may be an electric motor, or may be any other known type of prime mover.

An impeller assembly, indicated generally by the reference numeral 31, is supported within the housing 16 immediately adjacent the downstream end of the static vanes 26. The impeller assembly 31 is comprised of a plurality of impeller blades 32 that radiate from a hub portion 33. The hub portion 33 is integrally connected to a spider 34 that is, in turn, integrally connected at its inner end to a driving hub 35. The driving hub 35 is fixed for rotation with respect to a drive shaft 36 by means of a key and keyway 37. The forward end of the driving shaft 36 and impeller assembly 31 are supported for rotation by an anti-friction bearing 38 that is carried by the static vane hub portion 25. The rear end of the driving shaft 36 is supported in an anti-friction bearing 39 that is supported within an elongated extension 41 of a flange that is carried at the rear end of the housing assembly 16.

The forward end of the driving shaft 36 is drivably coupled, as by means of a splined connection (not shown), to a drive shaft 42 of the motor 29. Operation of the motor 29 will, therefore, rotate the drive shaft 36 and impeller assembly 31. The shape of the impeller blades 32 is such that they will amplify the swirling motion imparted to the intake air by the static vanes 26 to generate a boost in pressure of the intake air and impart a centrifugal force to the air as well as to any foreign particles such as sand, dirt or the like present in the intake air.

A generally cylindrical shaped fairing 43 is fixed to the impeller hub 33 and extends rearwardly into the air passage 19. The fairing 43 coacts with the impeller blades 32 to confine the air flow immediately adjacent the impeller 31 to the outer periphery of the air passage 19. Air bearing a higher concentration of foreign particles will be present immediately adjacent the housing 16 and purer air will pass immediately adjacent the fairing 43 due to the heavier weight of the foreign particles. The cleaner air will be inducted into the gas turbine 12 through an annular discharge passage defined by a cylindrical extension 44 that is supported adjacent the outer end of the housing 16 in alignment with the air outlet end 18. The air bearing the larger percentage of the foreign particles is discharged to the atmosphere through a dirt collector scroll 45 formed by the housing 16 adjacent the air outlet end 18. The inlet end of the scroll 45 coacts with the air passage 19 through an annular inlet passage 46 defined by the housing 16 and by a sheet metal member 47 that is fixed around the cylindrical projection 44. The outlet end of the scroll 45 is formed with a discharge duct 48 (FIGURE 3) so that air and the heavier foreign particles separated from the air inducted into the gas turbine 12 may be redischarged to the atmosphere.

In order that the described air cleaner 11 may be used in connection with conventional gas turbine engines without any redesign of their compressor blades, it is desirable if the air leaving the air cleaner 11 travels in a substantially axial path. As has been previously noted, the impeller assembly 31 and static vanes 26 impart a swirling motion to the air in the air cleaner 11. Thus, a plurality of straightening vanes 49 extend radially inwardly from the cylindrical extension 44 adjacent the air outlet end 18. The straightening vanes 49 extend in a substantially axial direction so that the air passing across them will again be turned for flow in a substantially axial direction.

It should be readily apparent that the described embodiment of the invention provides an effective device for removing foreign particles from the air delivered to a gas turbine engine. This purification is accomplished without the necessity for periodic servicing as would be required by barrier type filters and without any restriction upon intake air flow. In fact, as has been previously noted, the construction of the air cleaner 11 may provide some boost for the intake air. In some instances, it may be desirable to provide a positive control for the maximum size particle that can pass through the air cleaner 11. The embodiment shown in FIGURE 5 incorporates such a device.

Referring now to the embodiment of FIGURE 5, an air cleaner of a second embodiment of the invention has been identified generally by the reference numeral 61. The air cleaner 61 is similar in respect to the air cleaner 11 previously described and includes a housing assembly 62 that defines an air passage 63. An impeller assembly 64 is rotatably supported in the air passage 63 adjacent the air inlet end and has radially extending impeller blades 65 which may coact with static vanes (not shown). As in the previously described embodiment, the impeller assembly 64 may be driven from an auxiliary power source or may be driven directly from the compressor shaft of the associated gas turbine engine.

A fairing 66 is affixed for rotation with the impeller assembly 64 and a dirt collector scroll 67 is defined by the housing 62 adjacent the air outlet end of the air cleaner 61. The scroll 67 receives dirt and air from the air passage 63 through an annular air inlet 68 as in the previously described embodiment. In this embodiment, however, a perforate member 69 is interposed between the impeller 64 and an air outlet passage defined by a cylindrical projection 71 in which straightening vanes 72 are positioned. The perforate member is comprised of a downstream member 73 having a conical shape and in which a relatively large number of openings are formed. An upstream member 74 extends across the downstream member 73 and also is formed with a plurality of openings, which are smaller in size than the openings in the member 73. The member 73 is provided to lend structural strength to the perforate member 69.

The perforate member 69 is affixed for rotation with the impeller assembly 64 by means of a plurality of circumferentially spaced fasteners 75 (only one of which appears in the drawings). Any form of rotating seal (not shown) may be provided between the opposite end of the perforate member 69 and the cylindrical extension 71 so as to preclude any leakage at this point.

In operation, air bearing a higher percentage of foreign particles will be driven to the outer periphery of the passage 63 by the impeller 64 and its cooperating static vanes. This dirt laden air will be discharged to the atmosphere from the dirt collector scroll 67. Any particles which tend to escape into the gas turbine engine must first pass through the perforate member 69. Only particles smaller than the openings in the member 74 can pass through the perforate member 69. In addition, since the member 74 is disposed at an angle to the direction of air flow, the effective size of the openings in the member 74 will be reduced somewhat. Since the perforate member 69 is rotating, any particles which impinge upon it will tend to be thrown off for discharge through the scroll 67. Thus, the member 69 acts somewhat as a self-cleaning barrier type filter and due to its rotation and self-cleaning characteristics, periodic servicing either will not be required or will be required only after a relatively long operational interval.

What is claimed is:

1. An air cleaner for a gas turbine engine comprising cylindrical housing means defining an air inlet adapted to receive atmospheric air, an air outlet end adapted to communicate with the air inlet of the gas turbine engine and a generally cylindrical air passage extending from said air inlet end to said air outlet end, a plurality of static vanes supported in said air passage adjacent said air inlet end, said static vanes being shaped to impart a swirl to the intake air, impeller means supported for rotation within said air passage downstream from said static vanes, drive means for rotating said impeller means, said impeller means comprising blades shaped to impart a swirling motion to the intake air and entrained contaminants in the same direction as the direction of swirl generated by said static vanes for centrifugally driving said contaminants outwardly from the air passing through said air passage, contaminant discharge means formed around the periphery of said air passage for receiving the extracted contaminants and for precluding their passage from said air inlet end to the air inlet of the gas turbine engine by removal of the extracted contaminants from said housing means, tubular perforate means extending across said air passage between said impeller means and said air outlet end and positioned to intercept all of the air flowing out of said air outlet end, said perforate means having a plurality of openings therein fixed to exclude the passage of particles larger than a predetermined size into the associated gas turbine engine, said perforate means having its outer periphery disposed on the upstream side of said air passage and adjacent to the contaminant discharge means, said air outlet end of said housing means being defined by a cylindrical member extending into said cylindrical housing means in concentric relationship with said air passage and terminating at one end thereof within said air passage, said one end of said cylindrical member and said cylindrical housing means defining an air inlet to said contaminant discharge means, and means for affixing said perforate member for rotation with said impeller means for throwing particles impinging upon said perforate member radially outwardly into said contaminant discharge means.

2. An air cleaner as set forth in claim 1 further including a plurality of straightening vanes positioned within the housing means adjacent the air outlet end for directing the air discharged from said air cleaner into a substantially axial path as it enters the air inlet of the associated gas turbine engine.

3. An air cleaner as set forth in claim 1 further including an open discharge duct extending from the contaminant discharge means to the atmosphere for returning a portion of the air flowing into the air inlet end of said air cleaner and the extracted contaminants to the atmosphere.

References Cited

UNITED STATES PATENTS

| | | | |
|---|---|---|---|
| 3,035,792 | 5/1962 | Klapproth | 55—306 |
| 3,276,189 | 10/1966 | Sylvan | 55—401 |
| 3,362,155 | 1/1968 | Driscoll | 55—306 |
| 2,244,165 | 6/1941 | MacFarland et al. | 55—408 |
| 1,930,476 | 10/1933 | Hawley | 55—396 |
| 1,958,145 | 5/1934 | Jones | 55—400 |
| 2,010,456 | 8/1935 | Jones | 55—337 |
| 2,375,203 | 5/1945 | Appeldoorn | 55—406 |
| 2,420,840 | 5/1947 | Piquerez | 55—396 |
| 2,802,618 | 8/1957 | Prachar | 55—306 |
| 3,107,987 | 10/1963 | Duer | 55—404 |
| 3,258,895 | 7/1966 | Wiebe et al. | 55—337 |
| 3,263,906 | 8/1966 | Ward | 98—111 |
| 3,273,324 | 9/1966 | Jennings | 55—404 |
| 3,309,867 | 3/1967 | Ehrich | 55—396 |
| 3,336,733 | 8/1967 | Wisting | 55—228 |
| 3,354,621 | 11/1967 | Wilson | 55—337 |

HARRY B. THORNTON, *Primary Examiner.*

B. NOJICK, *Assistant Examiner.*

U.S. Cl. X.R.

55—317, 322, 336, 337, 403, 406, 416, 457; 60—39.09; 244—53